(12) United States Patent
Tracht

(10) Patent No.: US 7,290,792 B2
(45) Date of Patent: Nov. 6, 2007

(54) VEHICLE SEAT ASSEMBLY

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 353 days.

(21) Appl. No.: 10/904,839

(22) Filed: Dec. 1, 2004

(65) Prior Publication Data

US 2006/0113754 A1    Jun. 1, 2006

(51) Int. Cl.
*B60R 21/16* (2006.01)
*B60R 21/20* (2006.01)

(52) U.S. Cl. .................. 280/730.2; 280/728.2

(58) Field of Classification Search ............ 280/730.2, 280/728.3, 728.2, 743.1
See application file for complete search history.

(56) References Cited

U.S. PATENT DOCUMENTS

| | | | |
|---|---|---|---|
| 5,498,030 A | 3/1996 | Hill et al. | |
| 5,639,111 A | 6/1997 | Spencer et al. | |
| 5,678,853 A | 10/1997 | Maly | |
| 5,749,597 A | 5/1998 | Saderholm | |
| 5,762,363 A | 6/1998 | Brown et al. | |
| 5,779,262 A * | 7/1998 | Totani et al. | 280/728.3 |
| 5,810,389 A | 9/1998 | Yamaji et al. | |
| 5,816,610 A | 10/1998 | Higashiura et al. | |
| 5,860,673 A | 1/1999 | Hasegawa et al. | |
| 5,863,063 A | 1/1999 | Harrell | |
| 5,899,528 A * | 5/1999 | Rumpf et al. | 297/216.13 |
| 5,927,749 A | 7/1999 | Homier et al. | |
| 5,938,232 A | 8/1999 | Kalandek et al. | |
| 5,967,603 A | 10/1999 | Genders et al. | |
| 6,007,091 A | 12/1999 | Westrich | |
| 6,045,151 A | 4/2000 | Wu | |
| 6,237,934 B1 | 5/2001 | Harrell et al. | |
| 6,352,304 B1 | 3/2002 | Sorgenfrei | |
| 6,357,789 B1 | 3/2002 | Harada et al. | |
| 6,386,577 B1 | 5/2002 | Kan et al. | |
| 6,578,911 B2 | 6/2003 | Harada et al. | |
| 6,588,838 B1 | 7/2003 | Dick, Jr. et al. | |

(Continued)

FOREIGN PATENT DOCUMENTS

DE    203 19 605 U1    4/2004

(Continued)

OTHER PUBLICATIONS

U.S. Appl. No. 08/808,572, filed Feb. 28, 1997, Wu et al.

*Primary Examiner*—Ruth Ilan
*Assistant Examiner*—Tiffany L. Webb
(74) *Attorney, Agent, or Firm*—Brooks Kushman P.C.

(57) ABSTRACT

A vehicle seat assembly includes a trim cover defining an outside surface of the seat assembly, and including a frangible portion extending along a length of the trim cover. An airbag assembly includes an airbag and an inflator configured to supply gas to the airbag. An airbag housing includes a frangible portion along a side of the airbag housing that is generally aligned with the frangible portion of the trim cover. A tear strip is attached to the trim cover and spans the frangible portion of the trim cover to inhibit separation of the frangible portion of the trim cover prior to deployment of the airbag. The tear strip extends along at least some of the length of the frangible portion of the trim cover, and is configured to separate during deployment of the airbag to facilitate deployment of the airbag through the frangible portion of the trim cover.

19 Claims, 2 Drawing Sheets

U.S. PATENT DOCUMENTS

| | | |
|---|---|---|
| 2002/0063452 A1 | 5/2002 | Harada et al. |
| 2004/0227335 A1 | 11/2004 | Acker et al. |
| 2005/0156412 A1* | 7/2005 | Panagos et al. .......... 280/730.2 |
| 2006/0066078 A1 | 3/2006 | Hofmann |
| 2006/0113752 A1 | 6/2006 | Tracht |
| 2006/0113753 A1 | 6/2006 | Tracht et al. |
| 2006/0113763 A1 | 6/2006 | Tracht et al. |
| 2006/0113764 A1 | 6/2006 | Tracht |

FOREIGN PATENT DOCUMENTS

| | | |
|---|---|---|
| EP | 0 819 587 A1 | 1/1998 |
| EP | 0 788 940 A3 | 12/1999 |
| EP | 1 464 550 A1 | 10/2004 |
| EP | 1 527 964 A1 | 5/2005 |
| FR | 2 772 698 A1 | 6/1999 |
| JP | 8-225052 | 9/1996 |

* cited by examiner

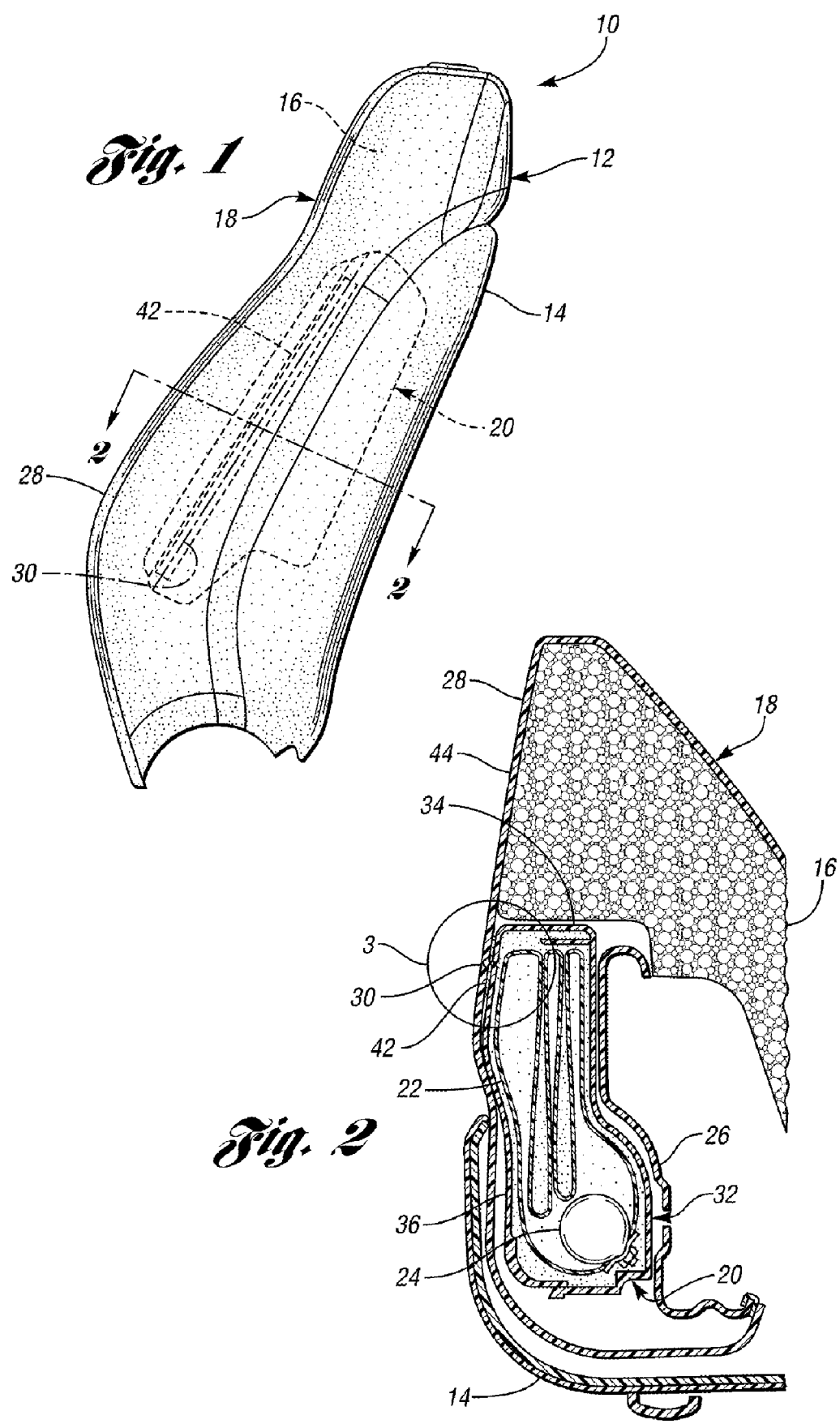

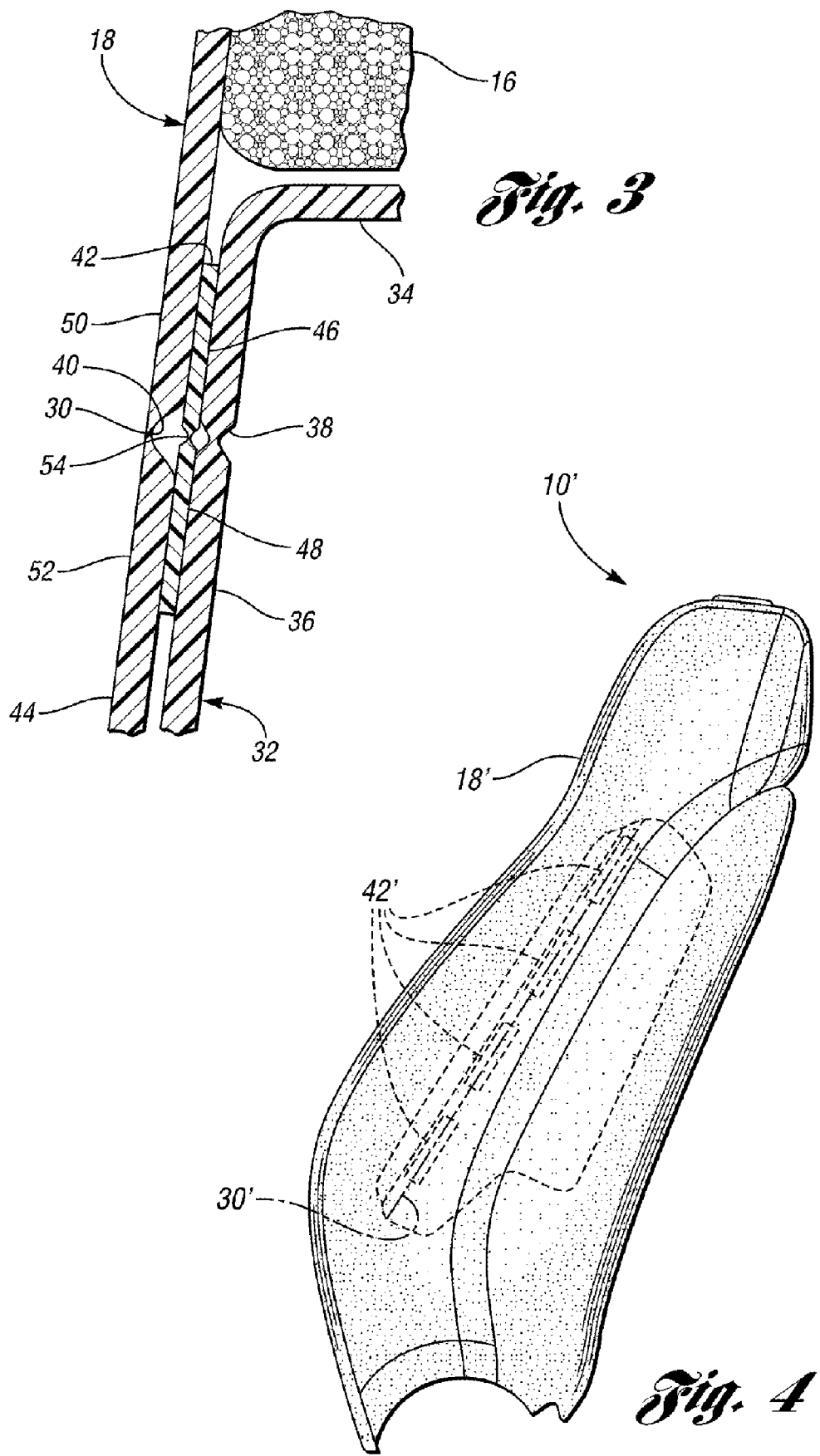

VEHICLE SEAT ASSEMBLY

BACKGROUND OF THE INVENTION

1. Field of the Invention

The present invention relates to a vehicle seat assembly, and in particular, a seat assembly including an airbag.

2. Background Art

Vehicles today are increasingly equipped with side airbags, which may be in the form of a side air curtain disposed in a headliner of the vehicle, or alternatively, may be an airbag disposed within a vehicle seat assembly. One limitation of airbags that are located within a seat assembly, is that the airbag needs to break through the seating material before it can fully deploy to protect a vehicle occupant. During deployment, such an airbag may encounter foam, or other seat pad materials, and then it may need to traverse a seat trim cover in order to exit the seat assembly. A number of attempts have been made to facilitate deployment of airbags from and through a vehicle seat assembly.

One such device is described in U.S. Pat. No. 5,816,610 issued to Higashiura et al. on Oct. 6, 1998. Higashiura et al. describes a seat structure having a side impact airbag apparatus. An airbag may be deployed along one side of the vehicle seat assembly, such that the folded airbag forms a part of the design surface of the seat back. That is, the airbag is not protected by a trim cover or any other seat material. Rather, a portion of the airbag itself forms the outer surface of a side of the seat assembly. One limitation of the seat structure described in Higashiura et al., is that a portion of the airbag is completely unprotected by a seat cover and/or seat pad materials. This portion of the airbag is exposed to the interior of the vehicle, and may be subject to damage. Therefore, a need exists for a seat assembly which protects the airbag when it is not deployed, and yet still allows the airbag to deploy quickly and efficiently through the seat materials.

SUMMARY OF THE INVENTION

Accordingly, the present invention provides a vehicle seat assembly which covers an airbag with a trim cover material, thereby protecting the airbag, but still facilitates fast and efficient deployment of the airbag through a weakened area in the trim cover.

The invention also provides a vehicle seat assembly, including a trim cover defining an outside surface of the seat assembly and including a frangible portion extending along a length of the trim cover. An airbag assembly includes an airbag disposed at least partially within an airbag housing, and an inflator configured to supply gas to the airbag, thereby facilitating deployment of the airbag. The airbag housing includes a frangible portion which is located along a side of the airbag housing, and is proximate the frangible portion of the trim cover. A reinforcing member is attached to the trim cover and spans the frangible portion of the trim cover to inhibit separation of the frangible portion of the trim cover prior to deployment of the airbag. The reinforcing member extends along at least some of the length of the frangible portion of the trim cover, and is configured to separate during deployment of the airbag to facilitate deployment of the airbag through the frangible portion of the trim cover.

The invention further provides a vehicle seat assembly, including a trim cover defining an outside surface of the seat assembly. The trim cover includes first and second portions, and a frangible portion between the first and second portions and extending along a length of the trim cover. An airbag assembly includes an airbag disposed at least partially within an airbag housing, and an inflator configured to supply gas to the airbag, thereby facilitating deployment of the airbag. The airbag housing includes a frangible portion which is located along a side of the airbag housing, and is proximate the frangible portion of the trim cover. A tear strip includes first and second legs respectively attached to the first and second portions of the trim cover to inhibit separation of the frangible portion of the trim cover prior to deployment of the airbag. The tear strip extends along at least some of the length of the frangible portion of the trim cover, and is configured to separate during deployment of the airbag to facilitate deployment of the airbag through the frangible portion of the trim cover.

The invention also provides a vehicle seat assembly, including a trim cover defining an outside surface of the seat assembly and including a frangible portion disposed along a side of the trim cover. An airbag assembly includes an airbag disposed at least partially within an airbag housing. An inflator is configured to supply gas to the airbag, thereby facilitating deployment of the airbag. The airbag housing includes a frangible portion which is located along a side of the airbag housing, and is proximate the frangible portion of the trim cover. A reinforcing member is disposed between the side of the trim cover and the side of the airbag housing. The reinforcing member spans the frangible portion of the trim cover to inhibit separation of the frangible portion of the trim cover prior to deployment of the airbag. The reinforcing member is configured to separate during deployment of the airbag to facilitate deployment of the airbag through the frangible portion of the trim cover.

BRIEF DESCRIPTION OF THE DRAWINGS

FIG. 1 is a fragmentary side view of a portion of a seat assembly in accordance with the present invention;

FIG. 2 is a fragmentary sectional view of the seat assembly shown in FIG. 1, taken through line 2-2;

FIG. 3 is a fragmentary sectional view showing a detail of a portion of the seat assembly shown in FIG. 2; and FIG. 4 is a fragmentary sectional view showing an alternative embodiment of the seat assembly shown in FIG. 1.

DETAILED DESCRIPTION OF THE PREFERRED EMBODIMENT(S)

FIG. 1 shows a portion of a seat assembly 10 in accordance with the present invention. The seat assembly 10 includes a seat back 12, a back panel 14, and seat pad 16 covered by a trim cover 18. The seat pad 16 is made from a molded polymeric material, such as a polyurethane foam. The use of a polymeric foam material to construct the seat pad 16 is cost effective and provides the flexibility needed to easily change the shape of the seat pad for different types of seat assemblies. Of course, other types of materials may be used to form a seat pad, such as the seat pad 16.

Disposed within the seat back 12 is an airbag assembly 20. As shown in FIG. 2, the airbag assembly 20 includes an airbag 22 and an inflator 24, which is configured to supply gas to the airbag 22, thereby facilitating deployment of the airbag 22. Also shown in FIG. 2 is a portion of a seat frame 26 which can used for mounting the seat assembly 10 to a vehicle. The seat pad 16 is disposed proximate the frame 26 and may be directly attached to the frame 26 at various points. The trim cover 18 defines an outside surface 28 of the seat assembly 10, and it includes a frangible portion 30, shown in detail in FIG. 3.

As indicated by the phantom line shown in FIG. 1, the frangible portion 30 of the trim cover 18 extends along a length of the trim cover 18. As shown in FIG. 1, the frangible portion 30 generally coincides with the length of the airbag assembly 20, but it may be longer or shorter, as desired. The frangible portion 30 provides a means by which the airbag 22 can exit the seat assembly 10 through the trim cover 18, without requiring the more complex configuration of a stitched seam. As explained more fully below, the use of a frangible portion in a seat trim cover, such as the frangible portion 30 in the trim cover 18, may be subject to failure prior to deployment of an airbag, unless additional support is provided, such as with the present invention.

Returning to FIG. 2, an airbag housing 32 is shown surrounding the airbag 22 and the inflator 24. The airbag housing 32 includes a front portion 34 and a side portion 36. The side portion 36 includes a frangible portion 38, best shown in FIG. 3. The frangible portion 38 of the airbag housing 32 is proximate the frangible portion 30 of the trim cover 18. This helps to facilitate deployment of the airbag 22 out of the airbag housing 32 and through the trim cover 18. Although the airbag housing 32 comprises a relatively rigid material, in other embodiments, a thin sheet of material may be used in place of a rigid housing. In such embodiments, the sheet need not contain a frangible portion, as its properties will be such that it will tear as the airbag 22 deploys.

In order to inhibit separation of the trim cover 18 at or near the frangible portion 30, prior to deployment of the airbag 22, the frangible portion 30 can be provided with a geometric shape that helps to achieve this end. For example, as shown in FIG. 3, the frangible portion 30 has no sharp corners. Rather, a root 40 of the frangible portion 30 has a generous radius, which helps to resist crack formation, and therefore, premature separation. The frangible portion 30 may be formed in the trim cover 18 by any method effective to achieve the desired configuration. One method that has been found to be effective is by laser etching a frangible portion into a trim cover. This method allows precise control over the geometry of the frangible portion, including the allowance of a generous radius at the root.

Even when a frangible portion of a trim cover, such as the frangible portion 30 of the trim cover 18, is provided with a geometry that inhibits premature separation, such a frangible portion, under some conditions, may still separate prior to deployment of an airbag. Therefore, the present invention provides a reinforcing member, or tear strip 42, disposed between a side portion 44 of the trim cover 18 and the side portion 36 of the airbag housing 32. The tear strip 42 includes first and second legs 46, 48 respectively attached to first and second portions 50, 52 of the trim cover 18. The tear strip 42 spans the frangible portion 30 of the trim cover 18 to inhibit separation of the frangible portion 30 prior to deployment of the airbag 22.

The tear strip 42 can be attached to the trim cover 18 by any method effective to allow the tear strip 42 to perform its intended function. For example, the tear strip 42 may be sewn to the trim cover 18, it can be sonic welded to the trim cover 18, or alternatively, an adhesive may be used to secure the tear strip 42 to the trim cover 18. The tear strip 42 may be made from a polymeric material, such as polypropylene, or any other material effective to allow the tear strip 42 to protect the trim cover 18 from premature separation, while still allowing the airbag 22 to exit the seat assembly 10 through the trim cover 18 during deployment.

A tear strip, such as the tear strip 42, may itself include a frangible portion, such as frangible portion 54, shown in FIG. 3. The frangible portion 54 of the tear strip 42 is generally aligned with the frangible portion 38 of the airbag housing 32 and the frangible portion 30 of the trim cover 18. This helps to facilitate deployment of the airbag 22 out of the seat assembly 10 through the trim cover 18. The geometry of the frangible portion 54 of the tear strip 42 can be configured to achieve the desired tensile strength to perform the dual functions of inhibiting premature separation of the frangible portion 30 of the trim cover 18, and allowing separation during deployment of the airbag 22. Of course, the properties of the material used to manufacture the tear strip 42 will also be a consideration when determining its specific configuration.

As shown in FIG. 1, the tear strip 42 is disposed along a length of the frangible portion 30 of the trim cover 18. In the embodiment shown in FIG. 1, the tear strip 42 is a unitary structure which extends for almost the entire length of the frangible portion 30. Of course, a tear strip, such as the tear strip 42, can be made to cover the entire length of a frangible portion of a trim cover, or alternatively, only some portion of it. In addition, rather than using a single tear strip, a number of tear strips can be used. For example, FIG. 4 shows a seat assembly 10' having a number of tear strips 42'. Each of the tear strips 42' spans a frangible portion 30' of a trim cover 18'. In such a configuration, the tear strips 42' are generally aligned with each other and cover only a portion of the length of the frangible portion 30'.

Returning to FIG. 2, it is shown that the tear strip 42 is disposed between the airbag housing 32 and the side 44 of the trim cover 18. The airbag 22 deploys through the side 44 of the trim cover 18 as it exits the seat assembly 10. The front portion 34 of the airbag housing 32 is disposed between the airbag 22 and the seat pad 16, thereby inhibiting contact between the airbag 22 and the seat pad 16 during deployment of the airbag 22. As noted above, the airbag housing 32 is made from a relatively rigid polymeric material; however, the airbag assembly 20 can be covered with a synthetic and/or natural fiber cloth material. In such a case, a panel (not shown), can be placed on either side of the tear strip 42. The panel, which can, for example, be made from a polymeric material such as nylon, would then help direct deployment of the airbag 22 through the tear strip 42, and ultimately out the trim cover 18.

By having the airbag 22 deploy through the trim cover 18 without extended travel through the seat assembly 10, and in particular, without traveling through the seat pad 16, the friction on the deploying airbag 22 is reduced. This not only helps to protect the seat pad 16 from damage, but also reduces deployment time for the airbag 22. Thus, in the embodiments illustrated in the drawing figures, the present invention facilitates deployment of the airbag 22 through the side 44 of the trim cover 18, while protecting the trim cover 18 from premature separation through the use of the tear strip 42. The seat pad 16 is also protected by the airbag housing 32, a portion of which is located between the airbag 22 and the seat pad 16.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:

a trim cover defining an outside surface of the seat assembly and including a frangible portion disposed at an unbroken portion of the trim cover and extending along a length of the trim cover;

an airbag assembly, including an airbag disposed at least partially within an airbag housing, and an inflator configured to supply gas to the airbag, thereby facilitating deployment of the airbag, the airbag housing including a frangible portion along a side of the airbag housing and proximate the frangible portion of the trim cover; and a reinforcing member attached to the trim cover and spanning the frangible portion of the trim cover to inhibit separation of the frangible portion of the trim cover prior to deployment of the airbag, the reinforcing member extending along at least some of the length of the frangible portion of the trim cover and being configured to separate during deployment of the airbag.

2. The vehicle seat assembly of claim 1, wherein the reinforcing member includes a frangible portion generally aligned with the frangible portions of the airbag housing and the trim cover, thereby facilitating separation of the reinforcing member during deployment of the airbag, and deployment of the airbag through the frangible portion of the trim cover.

3. The vehicle seat assembly of claim 1, wherein the reinforcing member comprises a unitary structure extending along the length of the trim cover.

4. The vehicle seat assembly of claim 1, further comprising a plurality of reinforcing members generally aligned with each other along at least some of the length of the frangible portion of the trim cover.

5. The vehicle seat assembly of claim 1, wherein the reinforcing member is disposed between the airbag housing and the trim cover.

6. The vehicle seat assembly of claim 1, further comprising a seat pad having the trim cover disposed thereover, and wherein a portion of the airbag housing is disposed between the airbag and the seat pad, thereby prohibiting contact between the airbag and the seat pad during deployment of the airbag.

7. A vehicle seat assembly, comprising:
a trim cover defining an outside surface of the seat assembly and including first and second portions formed from a continuous portion of the trim cover, and a frangible portion between the first and second portions and extending along a length of the trim cover;

an airbag assembly, including an airbag disposed at least partially within an airbag housing, and an inflator configured to supply gas to the airbag, thereby facilitating deployment of the airbag, the airbag housing including a frangible portion along a side of the airbag housing and proximate the frangible portion of the trim cover; and a tear strip including first and second legs attached to each other and respectively attached to the first and second portions of the trim cover to inhibit separation of the frangible portion of the trim cover prior to deployment of the airbag, the tear strip extending along at least some of the length of the frangible portion of the trim cover and being configured to separate during deployment of the airbag to facilitate deployment of the airbag through the frangible portion of the trim cover.

8. The vehicle seat assembly of claim 7, wherein the tear strip includes a frangible portion disposed between the first and second legs, and generally aligned with the frangible portions of the airbag housing and the trim cover, thereby facilitating separation of the tear strip during deployment of the airbag, and deployment of the airbag through the frangible portion of the trim cover.

9. The vehicle seat assembly of claim 7, wherein the tear strip comprises a unitary structure extending along the length of the trim cover.

10. The vehicle seat assembly of claim 7, further comprising a plurality of tear strips generally aligned with each other along at least some of the length of the frangible portion of the trim cover.

11. The vehicle seat assembly of claim 7, wherein the tear strip is disposed between the airbag housing and the trim cover.

12. The vehicle seat assembly of claim 7, further comprising a seat pad having the trim cover disposed thereover, and wherein a portion of the airbag housing is disposed between the airbag and the seat pad, thereby prohibiting contact between the airbag and the seat pad during deployment of the airbag.

13. A vehicle seat assembly, comprising:
a trim cover defining an outside surface of the seat assembly and including a frangible portion disposed at an unbroken portion of the trim cover along a side of the trim cover;

an airbag assembly, including an airbag disposed at least partially within an airbag housing, and an inflator configured to supply gas to the airbag, thereby facilitating deployment of the airbag, the airbag housing including a frangible portion along a side of the airbag housing and proximate the frangible portion of the trim cover; and a reinforcing member disposed between the side of the trim cover and the side of the airbag housing, and spanning the frangible portion of the trim cover to inhibit separation of the frangible portion of the trim cover prior to deployment of the airbag, the reinforcing member being configured to separate during deployment of the airbag to facilitate deployment of the airbag through the frangible portion of the trim cover.

14. The vehicle seat assembly of claim 13, further comprising a seat pad having the trim cover disposed thereover, and wherein the airbag housing includes a front portion disposed between the airbag and the seat pad, thereby prohibiting contact between the airbag and the seat pad during deployment of the airbag.

15. The vehicle seat assembly of claim 13, wherein the reinforcing member includes a frangible portion generally aligned with the frangible portions of the airbag housing and the trim cover, thereby facilitating separation of the reinforcing member during deployment of the airbag, and deployment of the airbag through the frangible portion of the trim cover.

16. The vehicle seat assembly of claim 13, wherein the frangible portion of the trim cover extends along a length of the trim cover, and wherein the reinforcing member comprises a unitary structure extending along the length of the trim cover.

17. The vehicle seat assembly of claim 13, wherein the frangible portion of the trim cover extends along a length of the trim cover, the seat assembly further comprising a plurality of reinforcing members generally aligned with each other along at least some of the length of the frangible portion of the trim cover.

18. The vehicle seat assembly of claim 13, wherein the reinforcing member comprises a polymeric material sonic welded to the trim cover.

19. The vehicle seat assembly of claim 13, wherein the reinforcing member is sewn onto the trim cover.

* * * * *